US012678870B2

(12) United States Patent    (10) Patent No.:     US 12,678,870 B2
     Gao                          (45) Date of Patent:          Jul. 14, 2026

(54) SIDE-MOUNTED DOUBLE-SAW SYNCHRONOUS TRANSMISSION APPARATUS

(71) Applicant: DALIAN FIELD MANUFACTURING CO., LTD., Dalian (CN)

(72) Inventor: Guowu Gao, Dalian (CN)

(73) Assignee: Dalian Field Manufacturing Co., Ltd., Dalian (CN)

( * ) Notice: Subject to any disclaimer, the term of this patent is extended or adjusted under 35 U.S.C. 154(b) by 381 days.

(21) Appl. No.: 18/423,242

(22) Filed: Jan. 25, 2024

(65) Prior Publication Data

US 2024/0261879 A1      Aug. 8, 2024

(30) Foreign Application Priority Data

Feb. 6, 2023    (CN) .......................... 202310070503.5

(51) Int. Cl.
     B23D 45/10          (2006.01)
     B23D 45/20          (2006.01)
                  (Continued)

(52) U.S. Cl.
     CPC ........... B23D 45/105 (2013.01); B23D 47/02 (2013.01); B23D 47/04 (2013.01); B23D 47/12 (2013.01); B23D 59/02 (2013.01); *B23D 45/20* (2013.01)

(58) Field of Classification Search
     CPC ...... B23D 45/20; B23D 45/105; B23D 47/00; B23D 47/02; B23D 47/04; B23D 47/12; B23D 59/02

(Continued)

(56) References Cited

U.S. PATENT DOCUMENTS

| 4,030,393 | A | * | 6/1977 | Steiner | ................... | B23D 45/20 |
|           |   |   |        |         |                    | 83/318 |
| 4,771,667 | A | * | 9/1988 | Forman | ................... | B23D 47/04 |
|           |   |   |        |         |                    | 83/494 |

(Continued)

FOREIGN PATENT DOCUMENTS

| CN | 105478893 A | 4/2016 |
| CN | 106424921 A | 2/2017 |

(Continued)

OTHER PUBLICATIONS

The First Office Action for Chinese Application No. 202310070503.5, dated Jun. 27, 2025, 11 pages.

*Primary Examiner* — James R Bidwell
(74) *Attorney, Agent, or Firm* — East IP P.C.

(57)          ABSTRACT

The present disclosure provides a side-mounted double-saw synchronous transmission apparatus, which includes a first transmission part and a second transmission part, both of which are disposed on a stationary base and can move back and forth, and is further provided with a side-mounted synchronizing device which is provided with a power shaft, where the first and second transmission parts are both in power transmission coupled with the power shaft. The power shaft can drive the first and second transmission parts to move back and forth alternately through forward and reverse rotation. The side-mounted synchronizing device is disposed on a side of the stationary base to stay away from water mist through extension of the power shaft, and an axial extension direction of the power shaft is perpendicular to a direction in which the first and second transmission parts move back and forth along an extension direction of the stationary base.

8 Claims, 9 Drawing Sheets

(51) Int. Cl.
| | |
|---|---|
| *B23D 47/02* | (2006.01) |
| *B23D 47/04* | (2006.01) |
| *B23D 47/12* | (2006.01) |
| *B23D 59/02* | (2006.01) |

(58) Field of Classification Search
USPC .......................................... 83/360, 373, 485
See application file for complete search history.

(56) References Cited

U.S. PATENT DOCUMENTS

| | | | |
|---|---|---|---|
| 5,427,159 A * | 6/1995 | Burgess | ............... B23D 59/008 |
| | | | 144/392 |
| 2020/0130074 A1 * | 4/2020 | Masuya | ............... B23D 47/042 |

FOREIGN PATENT DOCUMENTS

| | | | |
|---|---|---|---|
| CN | 111804989 A | 10/2020 | |
| CN | 112570799 A | 3/2021 | |
| CN | 115365574 A | 11/2022 | |
| CN | 218799537 U | 4/2023 | |

* cited by examiner

SIDE-MOUNTED DOUBLE-SAW SYNCHRONOUS TRANSMISSION APPARATUS

CROSS REFERENCE TO RELATED APPLICATION

This application claims priority to Chinese Patent Application No. 202310070503.5, filed on Feb. 6, 2023, which is hereby incorporated by reference in its entirety.

TECHNICAL FIELD

The present application relates to a field of high-speed fixed length cutting technology for continuous bar materials in automated production lines, specifically to a side-mounted double-saw synchronous transmission apparatus in a double-saw, high-speed and fixed length cutting machine.

BACKGROUND

In the current field of high-frequency welded pipe production line technology, there are more and more high-speed and ultra-high speed continuous welded pipe production lines. With development of the technology, the requirements for cutting of continuous tubular materials are also increasing. As a result, high-speed double-saw cutting machines are gradually formed. The existing high-speed double-saw cutting machine adopts a middle-mounted synchronous transmission device for driving two sawing devices of the double-saw machine to move synchronously and alternately, and an electric motor in the middle-mounted synchronous transmission device is structurally located just below the continuous tubular material that needs to be cut. Since the continuous tubular material is cooled by a large amount of water during the production process, when the water pass across the electric motor in the middle-mounted synchronous transmission device, some water will enter a cooling system of the electric motor, causing great safety hazards. Even if certain protective measures are taken, since a large amount of the cooling water will produce a certain amount of water mist and a fan is just needed by the cooling system of the electric motor for air cooling, the water mist will be brought into the cooling system of the electric motor more or less by the wind generated by the fan. Therefore, the protective measures cannot essentially avoid the hazards caused by the cooling water to the electric motor in the middle-mounted synchronous transmission device to a certain extent.

SUMMARY

In order to solve the above problems, it is necessary to develop a side-mounted double-saw synchronous transmission device that can avoid the hazards caused by the cooling water.

The implementations of the present disclosure provides a side-mounted double-saw synchronous transmission apparatus that can avoid hazards caused by cooling water in actual production, where a side-mounted synchronizing device is disposed on an outer side relative to a direction in which two sawing devices move back and forth under driving of two transmission devices respectively along an extension direction of a base of a sawing machine, and the side-mounted synchronizing device synchronously drives the two transmission devices to move through alternate forward and reverse rotations of a power shaft extending outwardly, so as to achieve an operation of the two sawing devices. Since the side-mounted synchronizing device is located far away from a continuous tubular material that needs to be cut off, the hazards caused by the cooling water can be avoided essentially.

Specifically, a side-mounted double-saw synchronous transmission apparatus is provided, which is adapted to drive a double-saw milling-sawing machine in a forward and reverse synchronization to operate and stay away from water mist caused by a cooling system, and comprises a first transmission part p1 and a second transmission part p2; the double-saw milling-sawing machine is further provided with a first sawing device j1 and a second sawing device j2, the first sawing device j1 is fixed on the first transmission part p1, the second sawing device j2 is fixed on the second transmission part p2, and the first transmission part p1 and the second transmission part p2 are both disposed on a stationary base gd and are movable back and forth along an extension direction of the stationary base gd, characterized in that, the apparatus is further provided with a side-mounted synchronizing device cj which is provided with a power shaft cd, the first transmission part p1 and the second transmission part p2 are both in power transmission coupled with the power shaft cd, and the power shaft cd can drive the first transmission part p1 and the second transmission part p2 to move back and forth alternately through alternate forward and reverse rotation, and the side-mounted synchronizing device cj is disposed on a side of the stationary base gd by means of extension of the power shaft cd so as to stay away from the water mist, and an axial extension direction of the power shaft cd is perpendicular to a direction in which the first transmission part p1 and the second transmission part p2 move back and forth along the extension direction of the stationary base gd.

According to one aspect of the specific implementation of the present disclosure, the power shaft cd is further provided with a first transmission shaft cd1 and a second transmission shaft cd2, the first transmission part p1 is coupled with the first transmission shaft cd1, and the second transmission part p2 is coupled with the second transmission shaft cd2; the first transmission shaft cd1 and the second transmission shaft cd2 are arranged parallel to each other on the same side of the first transmission part p1 and the second transmission part p2.

According to one aspect of the specific implementation of the present disclosure, the first transmission part p1 is provided with a first synchronous belt c1 and a first driving wheel cz1, the second transmission part p2 is provided with a second synchronous belt c2 and a second driving wheel cz2, the first driving wheel cz1 is coupled with the first transmission shaft cd1 through a coupling, and the second driving wheel cz2 is coupled with the second transmission shaft cd2 through a coupling.

According to one aspect of the specific implementation of the present disclosure, the side-mounted synchronizing device cj is further provided with a first gear cel and a second gear cc2 meshed with each other and with the same number of teeth, the first gear cel is installed on the first transmission shaft cd1, and the second gear cc2 is installed on the second transmission shaft cd2; the first gear cel and the second gear cc2 rotate with the same rational speed and opposite rotational directions when they mesh with each other for power transmission.

According to one aspect of the specific implementation of the present disclosure, the apparatus is further provided with an electric motor dd, which is axially coupled with the first transmission shaft cd1 or the second transmission shaft cd2 and is disposed opposite to the first driving wheel cz1 and the second driving wheel cz2.

According to one aspect of the specific implementation of the present disclosure, a first driven wheel cs1 is further disposed on an inner side of the first synchronous belt c1, both the first driving wheel cz1 and the first driven wheel cs1 are disposed on the stationary base gd, and the first synchronous belt c1 can rotate under the support of the first driving wheel cz1 and the first driven wheel cs1.

According to one aspect of the specific implementation of the present disclosure, a second driven wheel cs2 is further disposed on an inner side of the second synchronous belt c2, both the second driving wheel cz2 and the second driven wheel cs2 are disposed on the stationary base gd, and the second synchronous belt c2 can rotate under the support of the second driving wheel cz2 and the second driven wheel cs2.

According to one aspect of the specific implementation of the present disclosure, extension directions of the first synchronous belt c1 and the second synchronous belt c2 are both along a length direction of the stationary base gd, and the first synchronous belt c1 and the second synchronous belt c2 are parallel to each other in their extension directions.

BRIEF DESCRIPTION OF THE DRAWINGS

The features, advantages and technical effects of exemplary embodiments of the present application will be described below with reference to the accompanying drawings.

Description of reference numerals: power shaft cd, first transmission part p1, first synchronous belt c1, first driving wheel cz1, first transmission shaft cd1, first driven wheel cs1, second transmission part p2, second synchronous belt c2, second driving wheel cz2, second transmission shaft cd2, second driven wheel cs2, first sawing device j1, second sawing device j2, stationary base gd, side-mounted synchronous driving device cj, first gear cc1, second gear cc2, housing xt, electric motor dd, continuous material w, first rack t1, first transmission gear cp1, second rack t2, and second transmission gear cp2.

In the accompanying drawings, the same reference numerals are used for the same components. The accompanying drawings are not drawn to the actual scale.

DETAILED EMBODIMENTS OF THE PRESENT DISCLOSURE

The implementations of the present disclosure are further described in detail below in combination with the accompanying drawings and embodiments. The detailed description of the following embodiments and accompanying drawings are used to exemplarily illustrate the principle of the present disclosure, while not intended to limit the scope of the present disclosure, that is, the present disclosure is not limited to the described preferred embodiments, and the scope of the present disclosure is defined by the claims.

In the description of embodiments of the present disclosure, it should be noted that, unless otherwise stated, the terms "perpendicular" and "parallel" not only refer to "perpendicular" and "parallel" absolutely in mathematical sense, but also can be understood as "roughly perpendicular" and "roughly parallel".

Figure 1:
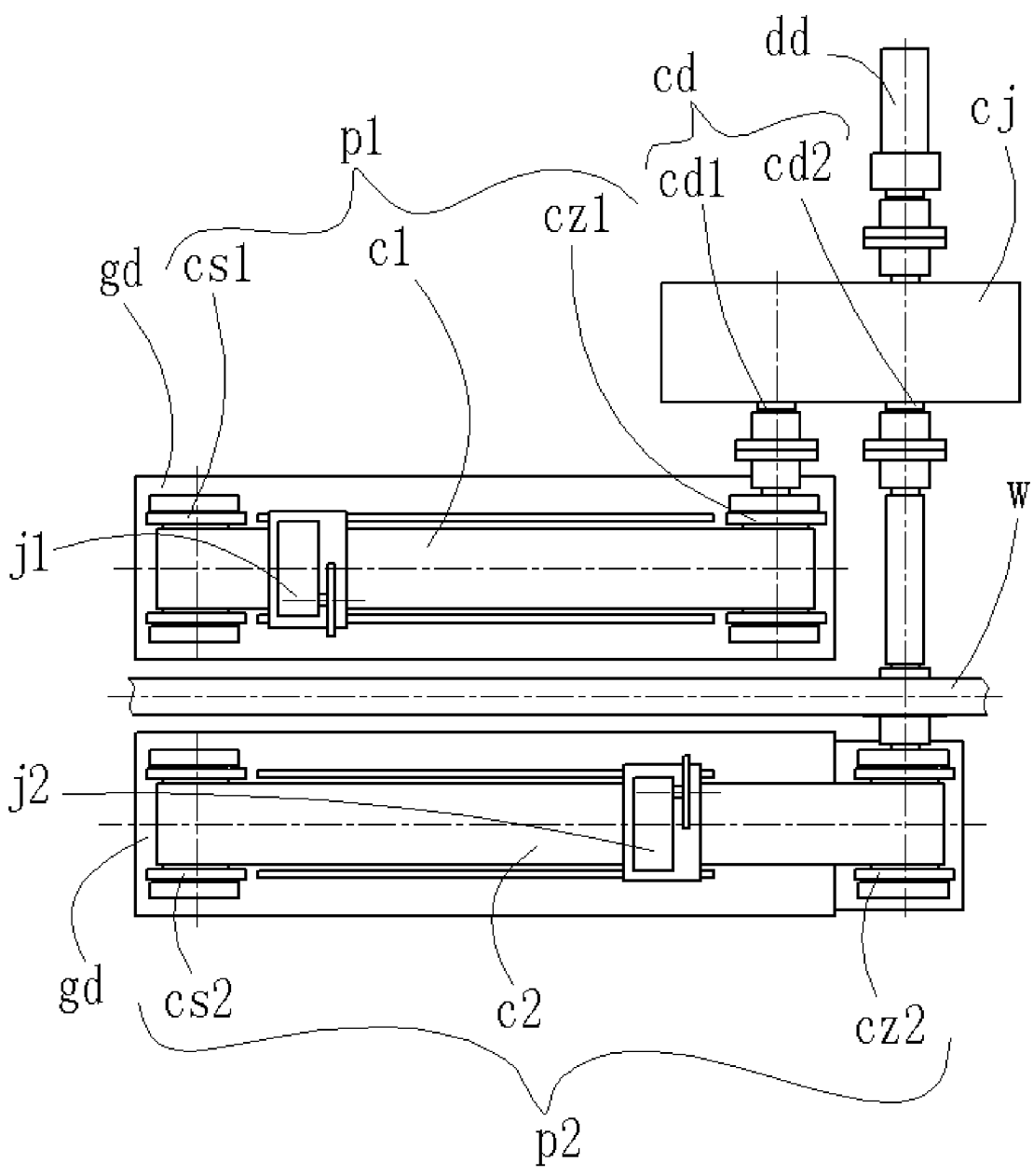
FIG. 1 is a basic structural diagram of an overall layout of a first embodiment of the present disclosure.

FIG. 1 is a basic structural diagram of an overall layout of a first embodiment of the present disclosure.

Figure 2:
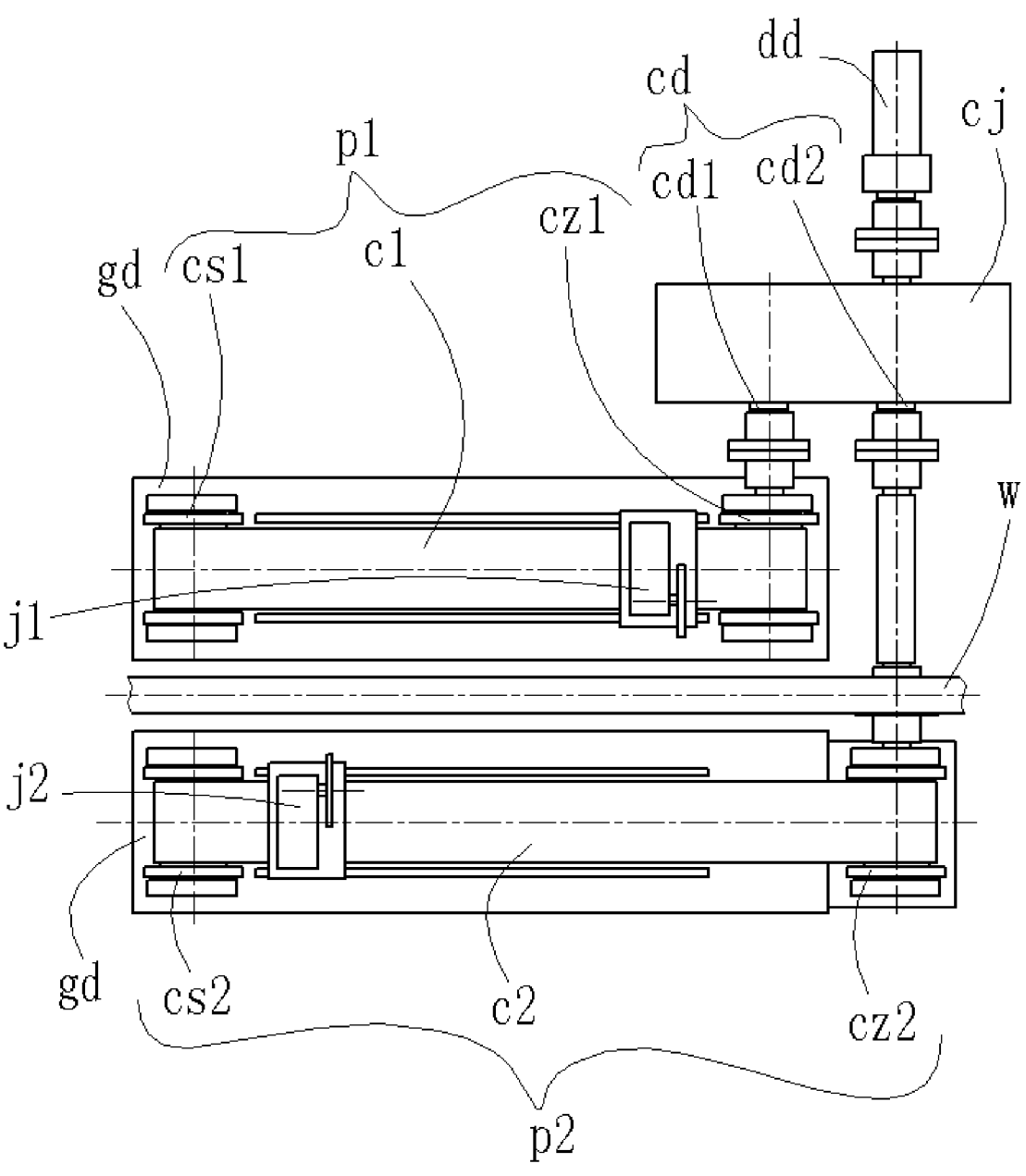
FIG. 2 is a schematic diagram of alternation between the first sawing device j1 and a second sawing device j2 in the first embodiment of the present disclosure.

FIG. 2 is a schematic diagram of alternation between a first sawing device j1 and a second sawing device j2 in the first embodiment of the present disclosure.

As shown in FIGS. 1 and 2, the present embodiment provides a side-mounted double-saw synchronous transmission apparatus that can avoid hazards caused by cooling water in actual production, where a side-mounted synchronizing device is disposed on an outer side relative to a direction in which two sawing devices move back and forth under driving of two transmission devices respectively along an extension direction of a base of a sawing machine, and the side-mounted synchronizing device synchronously drives the two transmission devices to move through alternate forward and reverse rotations of a power shaft extending outwardly, so as to achieve an operation of the two sawing devices. As the side-mounted synchronizing device is located far away from a continuous tubular material that needs to be cut off, the hazards caused by the cooling water can be avoided essentially. The specific structure of the technical solution in the present embodiment may include a stationary base gd, a first transmission part p1, a second transmission part p2, a first sawing device j1, and a second sawing device j2, where two stationary bases gd are provided and arranged side by side with each other. The first transmission part p1 and the second transmission part p2 are both disposed on the stationary bases gd, the first sawing device j1 is fixed on the first transmission part p1, and the second sawing device j2 is fixed on the second transmission part p2; the first sawing device j1 and the second sawing device j2 are further coupled with the stationary bases gd through linear slide rails respectively, and can freely slide along extension directions of the stationary bases gd under the action of the linear slide rails. Trajectories of the first sawing device j1 and the second sawing device j2 generated when sliding along the extension directions of the stationary bases gd are parallel to each other. Under the driving of the first transmission part p1 and the second transmission part p2, the first sawing device j1 and the second sawing device j2 can move back and forth alternately while sliding along the linear slide rails.

Figure 3:
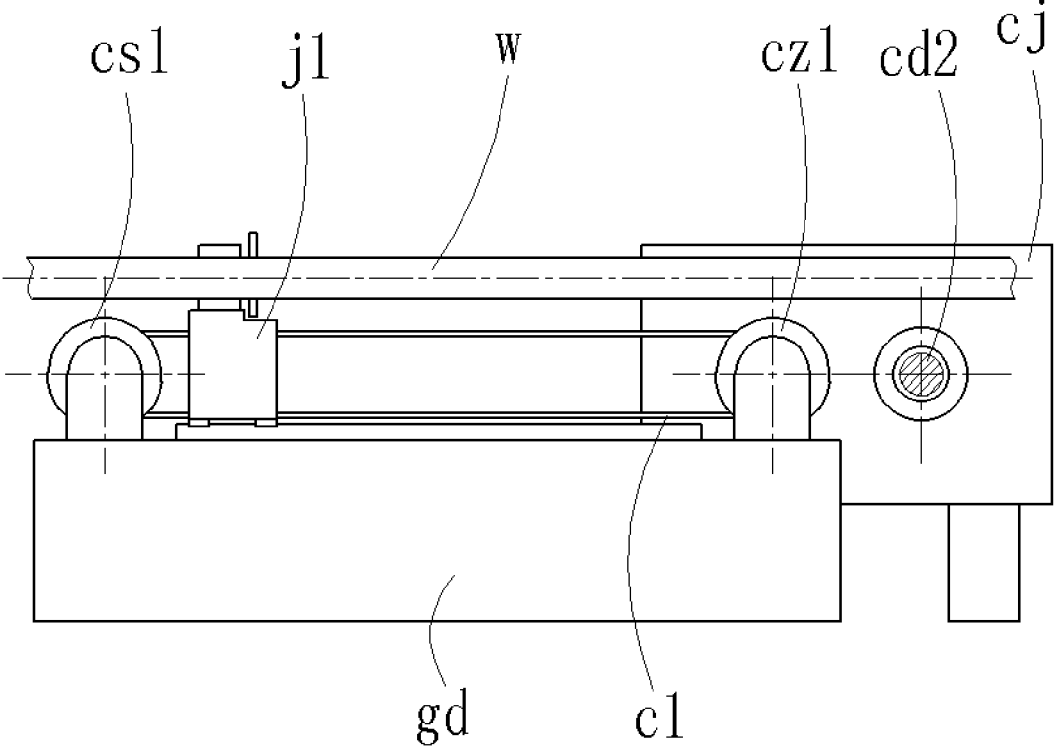
FIG. 3 is a schematic diagram of a layout of a first synchronous belt c1 in a front view in the first embodiment of the present disclosure.

FIG. 3 is a schematic diagram of a layout of a first synchronous belt c1 in a front view in the first embodiment of the present disclosure.

As shown in FIG. 3, in the technical solution of the first embodiment, the first transmission part p1 is formed as a first synchronous belt transmission system, in which a first synchronous belt c1 is provided, and a first driving wheel cz1 and a first driven wheel cs1 are further provided on the first synchronous belt c1; both the first driving wheel cz1 and the first driven wheel cs1 are provided with wheel frames, and are fixedly installed on one of the stationary bases gd through the wheel frames, and the first synchronous belt c1 can rotate under the support of the first driving wheel cz1 and the first driven wheel cs1; when the first driving wheel cz1 rotates, the first synchronous belt c1 can rotate synchronously under its driving. Further, in the technical solution of the first embodiment, the second transmission part p2 is formed as a second synchronous belt transmission system, in which a second synchronous belt c2 is provided, and a second driving wheel cz2 and a second driven wheel cs2 are further provided on the second synchronous belt c2; both the second driving wheel cz2 and the second driven wheel cs2 are provided with wheel frames, and are fixedly installed on the other stationary base gd through the wheel frames, and the second synchronous belt c2 can rotate under the support of the second driving wheel cz2 and the second driven wheel cs2; when the second driving wheel cz2 rotates, the second synchronous belt c2 can rotate synchronously under its driving.

Further, in the technical solution of the first embodiment, extension directions of the first synchronous belt c1 and the second synchronous belt c2 are both along length directions of the stationary bases gd, a moving trajectory of the first synchronous belt c1 in its extension direction is the same as a moving trajectory of the first sawing device j1 along the linear slide rail, a moving trajectory of the second synchronous belt c2 in its extension direction is the same as a moving trajectory of the second sawing device j2 along the linear slide rail, and the moving trajectories of the first synchronous belt c1 and the second synchronous belt c2 in their respective extension directions are parallel to each other.

Further, in the technical solution of the first embodiment, a side-mounted synchronizing device cj is provided, and is arranged on a side of the two stationary bases gd arranged side by side in spatial position; the side-mounted synchronizing device cj is further a power shaft cd, which is further provided with a first transmission shaft cd1 and a second transmission shaft cd2, the first driving wheel cz1 is coupled with the first transmission shaft cd1 through a coupling, and the second driving wheel cz2 is coupled with the second transmission shaft cd2 through a coupling. The first transmission shaft cd1 and the second transmission shaft cd2 are arranged parallel to each other on the same side of the first driving wheel cz1 and the second driving wheel cz2.

Figure 4:
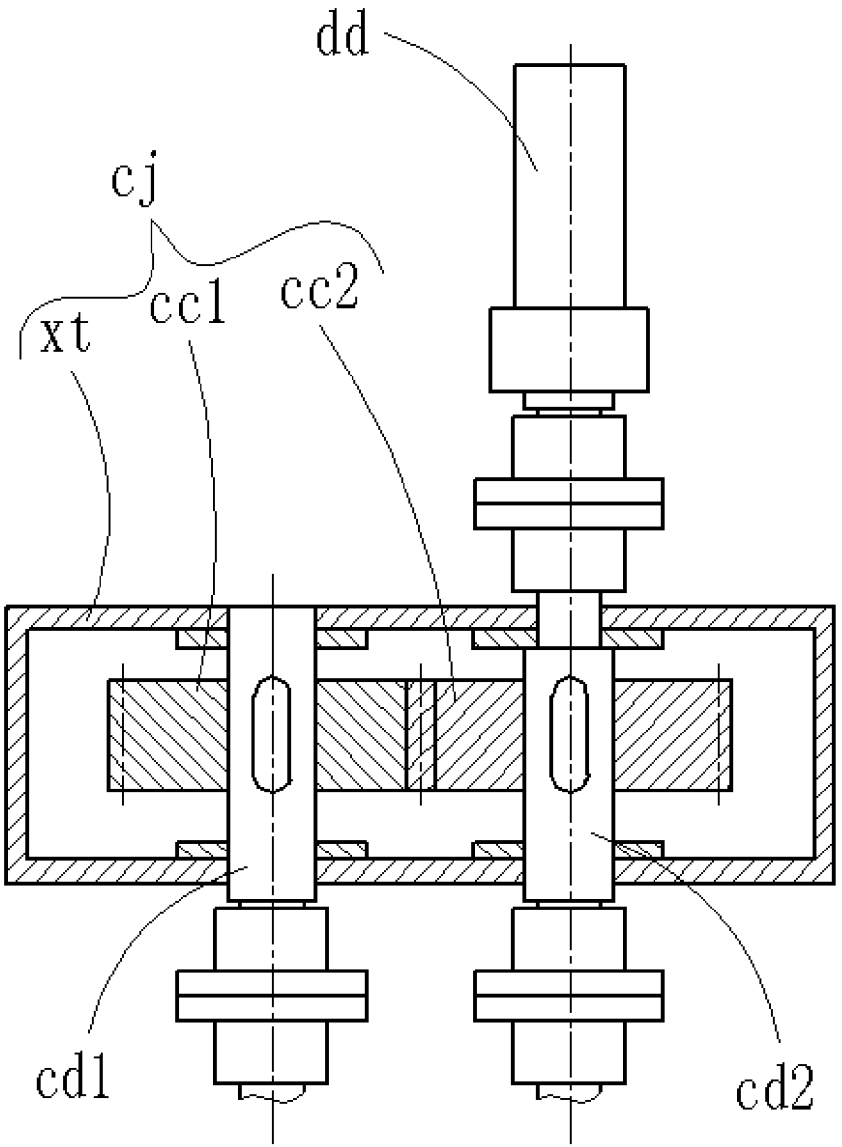
FIG. 4 is a sectional schematic diagram of a side-mounted synchronizing device cj in the first embodiment of the present disclosure.

FIG. 4 is a sectional schematic diagram of a side-mounted synchronizing device cj in the first embodiment of the present disclosure.

Figure 5:
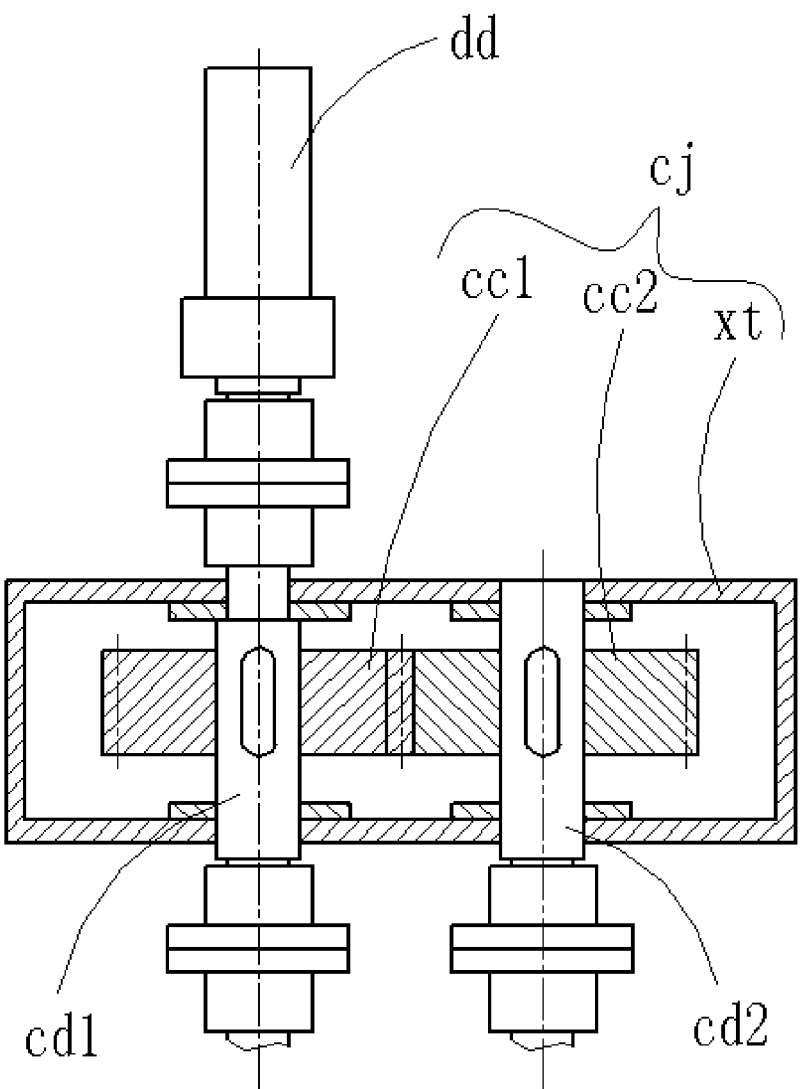
FIG. 5 is a schematic diagram of a side-mounted synchronizing device cj of another implementation in the first embodiment of the present disclosure.

FIG. 5 is a schematic diagram of a side-mounted synchronizing device cj of another implementation in the first embodiment of the present disclosure.

As shown in FIGS. 4 and 5, the side-mounted synchronizing device cj is further provided with a first gear cc1, a second gear cc2, and a housing xt, the first gear cc1, the second gear cc2, the first transmission shaft cd1, and the second transmission shaft cd2 are all arranged inside the housing xt, and the first gear cc1 and the second gear cc2 are meshed with each other and have the same number of teeth; the first gear cel is installed on the first transmission shaft cd1, and the second gear cc2 is installed on the second transmission shaft cd2; the first gear cel and the second gear cc2 have the same rotational speed and opposite rotational directions when they mesh with each other for transmission; when the first gear cel and the second gear cc2 rotate, they can respectively drive the first transmission shaft cd1 and the second transmission shaft cd2 to rotate synchronously.

Further, in the technical solution of the first embodiment, an electric motor dd is further provided, which is axially coupled with the first transmission shaft cd1 or the second transmission shaft cd2 and is disposed opposite to the first driving wheel cz1 and the second driving wheel cz2; when the electric motor dd is axially coupled with the first transmission shaft cd1 through a coupling, the electric motor dd can generate torque and drive the first transmission shaft cd1 to rotate, and meanwhile the first gear cel located on the first transmission shaft cd1 can mesh with the second gear cc2 to generate transmission and drive the second transmission shaft cd2 to rotate in a direction opposite to the first transmission shaft cd1 by the same number of revolutions. When the electric motor dd is axially connected to the second transmission shaft cd2 through a coupling, the electric motor dd can generate torque and drive the second transmission shaft cd2 to rotate, and meanwhile the second gear cc2 located on the second transmission shaft cd2 can mesh with the first gear cel to generate transmission and drive the first transmission shaft cd1 to rotate in a direction opposite to the second transmission shaft cd2 with the same number of revolutions. The rotations of the first transmission shaft cd1 and the second transmission shaft cd2 can respectively drive the first driving wheel cz1 and the second driving wheel cz2 to rotate synchronously, and ultimately it can be achieved that the first sawing device j1 and the second sawing device j2 alternately move back and forth while sliding along the linear slide rails.

Further, the first sawing device j1 and the second sawing device j2 are both provided with high-speed saw blades, and the first sawing device j1 and the second sawing device j2 respectively cut off a continuous material w located between the first sawing device j1 and the second sawing device j2, with a fixed length through the high-speed saw blades provided on them, while alternately moving back and forth, where the continuous material w is feed in a direction parallel to the moving trajectories of the first sawing device j1 and the second sawing device j2.

Figure 6:
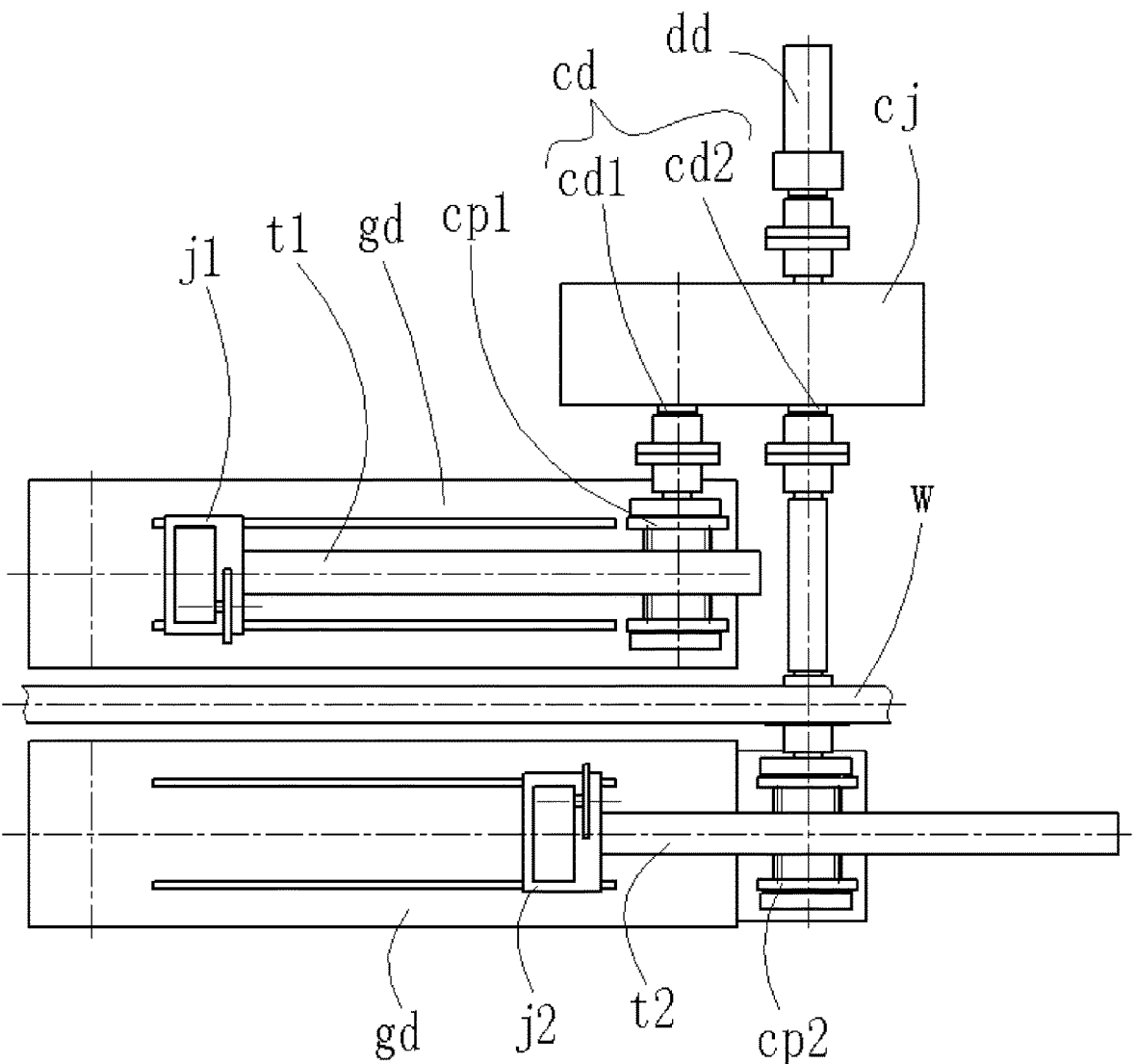
FIG. 6 is a basic structural diagram of an overall layout of a second embodiment of the present disclosure.

FIG. 6 is a basic structural diagram of an overall layout of a second embodiment of the present disclosure.

Figure 7:
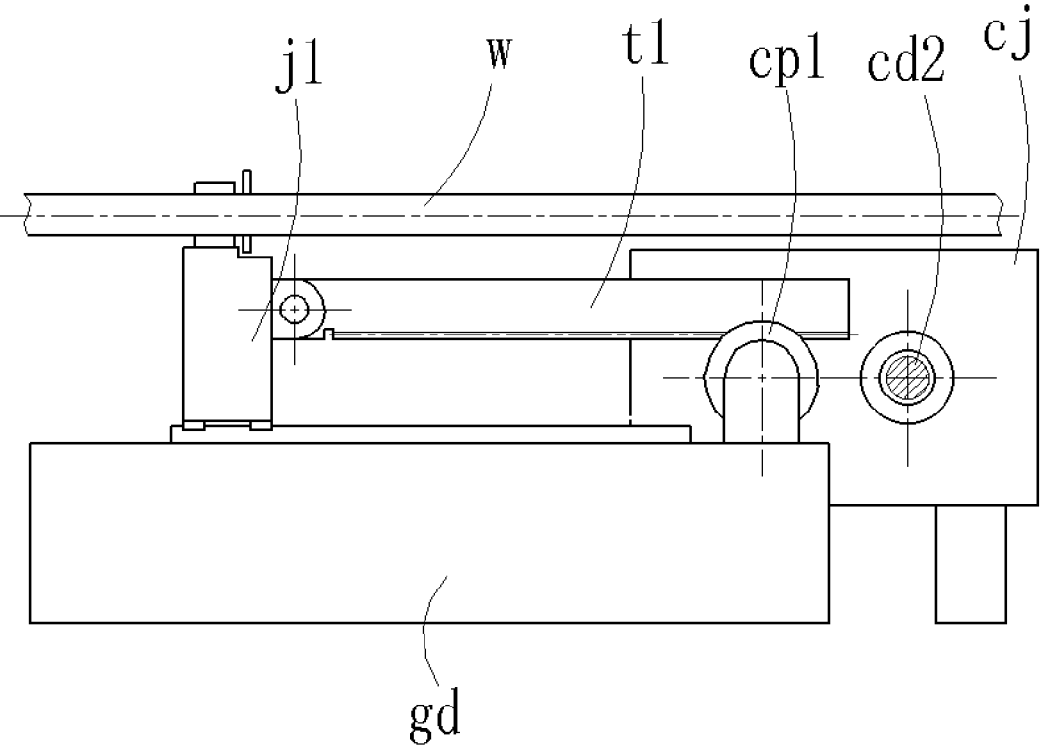
FIG. 7 is a schematic diagram of a layout of a first rack t1 in a front view in the second embodiment of the present disclosure.

FIG. 7 is a schematic diagram of a layout of a first rack t1 in a front view in the second embodiment of the present disclosure.

As shown in FIGS. 6 and 7, according to one aspect of the specific implementation of the second embodiment of the present disclosure, the specific distinguishing technical feature from the first embodiment is that the first transmission part p1 is formed as a first gear rack transmission system, and the first gear rack transmission system is provided with a first rack t1 and a first transmission gear cp1, which can mesh with each other for power transmission. The first transmission gear cp1 is provided with a wheel frame and fixedly installed on one of the stationary bases gd, and the first rack t1 is fixedly coupled to one end of the first sawing device j1; when the first transmission gear cp1 rotates, the first rack t1 can be driven by it to synchronously drive the first sawing device j1 to move.

Further, in the technical solution of the second embodiment, the second transmission part p2 is formed as a second gear rack transmission system, and the second gear rack transmission system is provided with a second rack t2 and a second transmission gear cp2, which can mesh with each other for power transmission. The second transmission gear cp2 is provided with a wheel frame and fixedly installed on the other stationary base gd, and the second rack t2 is fixedly coupled to one end of the second sawing device j2; when the second transmission gear cp2 rotates, the second rack t2 can be driven by it to synchronously drive the second sawing device j2 to move.

Further, in the technical solution of the second embodiment, a side-mounted synchronizing device cj is further provided, and is arranged on a side of the two stationary bases gd arranged side by side in spatial position; the side-mounted synchronizing device cj is further provided with a first transmission shaft cd1 and a second transmission shaft cd2, where the first transmission gear cp1 is coupled with the first transmission shaft cd1 through a coupling, and the second transmission gear cp2 is coupled with the second transmission shaft cd2 through a coupling. The first transmission shaft cd1 and the second transmission shaft cd2 are arranged parallel to each other on the same side of the first transmission gear cp1 and the second transmission gear cp2.

Rotations of the first transmission shaft cd1 and the second transmission shaft cd2 can respectively drive the first transmission gear cp1 and the second transmission gear cp2 to rotate synchronously, and ultimately it can be achieved that the first sawing device j1 and the second sawing device j2 alternately moves back and forth while sliding along the linear slide rails.

Figure 8:
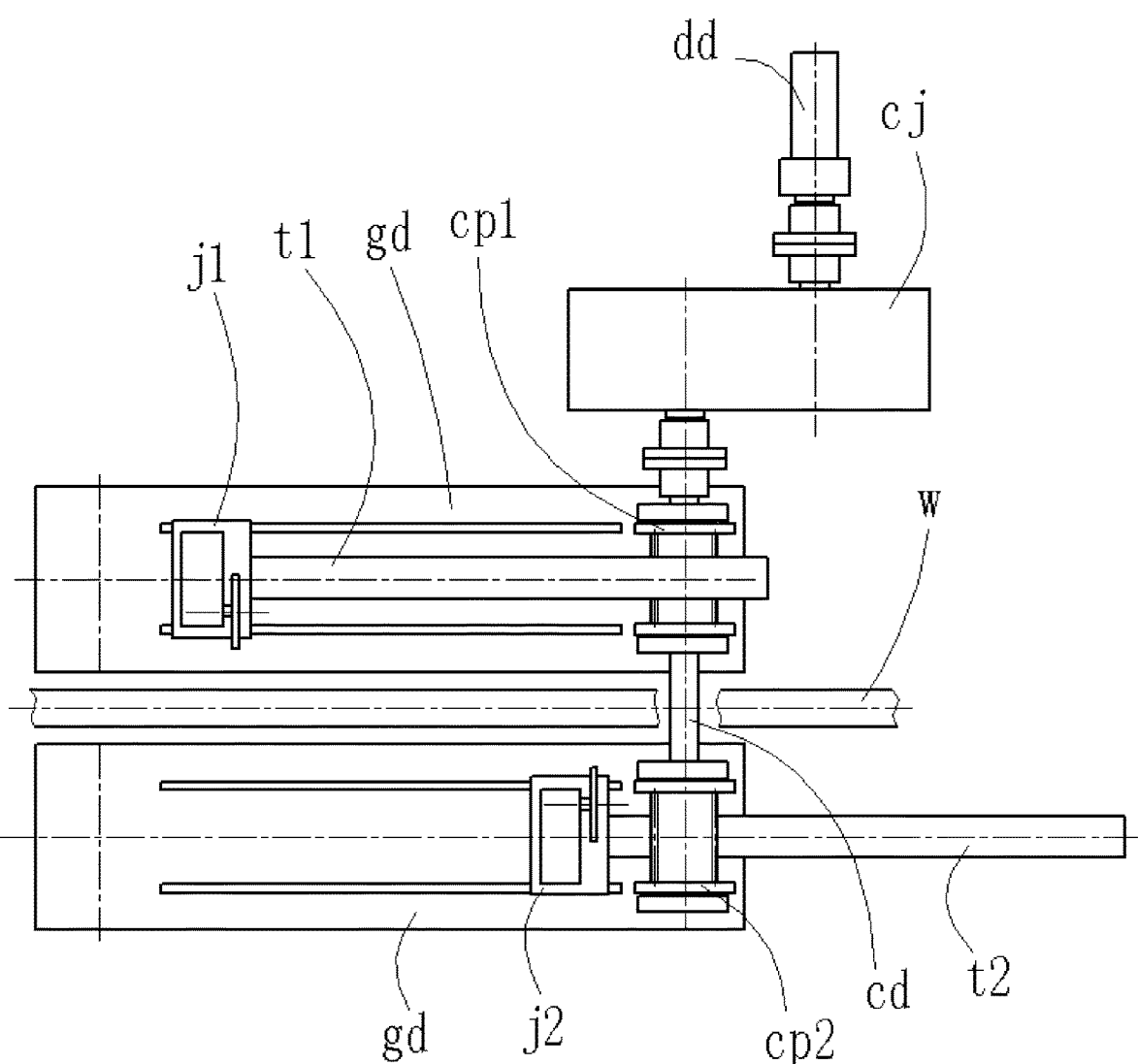
FIG. 8 is a basic structural diagram of an overall layout of a third embodiment of the present disclosure.

FIG. 8 is a basic structural diagram of an overall layout of a third embodiment of the present disclosure.

Figure 9:
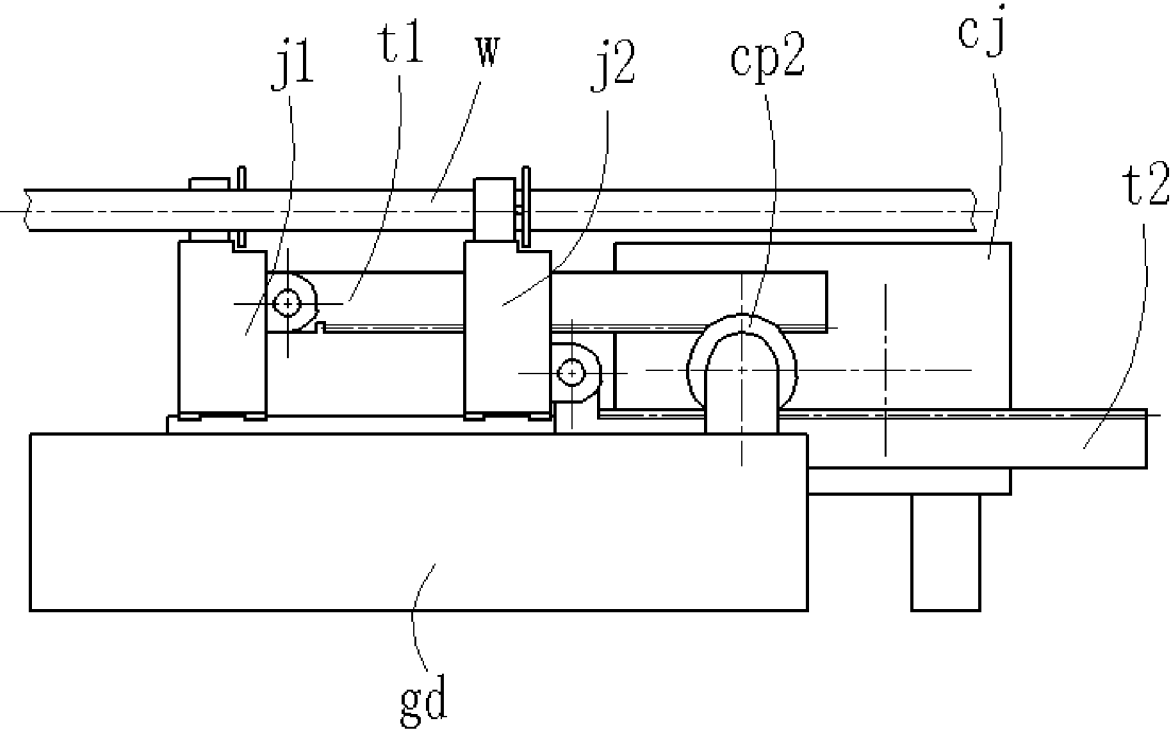
FIG. 9 is schematic diagram of a layout of a second rack t2 in the third embodiment of the present disclosure.

FIG. 9 is a schematic diagram of a layout of a second rack t2 in the third embodiment of the present disclosure.

As shown in FIGS. 8 and 9, according to one aspect of the specific implementation of the third embodiment of the present disclosure, the distinguishing technical feature from the second embodiment is that the side-mounted synchronizing device cj is further provided with a power shaft cd, and both the first transmission gear cp1 and the second transmission gear cp2 are coaxially coupled with the power shaft cd through respective couplings; the first rack t1 and the first transmission gear cp1 can mesh with each other for power transmission while the first rack t1 is located on an upper side of the first transmission gear cp1, the second rack t2 and the second transmission gear cp2 can mesh with each other for power transmission while the second rack t2 is located on a lower side of the second transmission gear cp2, and the first rack t1 and the second rack t2 are respectively located on two opposite sides relative to an axial direction of the power shaft cd. The rotation of the power shaft cd can respectively drive the first transmission gear cp1 and the second transmission gear cp2 to rotate synchronously, which respectively drive the first rack t1 and the second rack t2 to move synchronously in opposite directions, and ultimately it can be achieved that the first sawing device j1 and the second sawing device j2 alternately moves back and forth while sliding on the linear slide rails.

It should be understood that the description of the specific embodiments of the present disclosure in the specification is exemplary and should not be interpreted as an improper limitation on the scope of protection of the present disclosure. The scope of protection of the present disclosure is defined by the claims, and covers all the implementations falling within its scope and obvious equivalent variations thereof.

What is claimed is:

1. A side-mounted double-saw synchronous transmission apparatus, which is adapted to drive a double-saw milling-sawing machine in a forward and reverse synchronization to operate and stay away from water mist caused by a cooling system, and comprises a first transmission part and a second transmission part; the double-saw milling-sawing machine is further provided with a first sawing device and a second sawing device, the first sawing device is fixed on the first transmission part, the second sawing device is fixed on the second transmission part, and the first transmission part and the second transmission part are both disposed on a stationary base and are movable back and forth along an extension direction of the stationary base, wherein the apparatus is further provided with a side-mounted synchronizing device which is provided with a power shaft, the first transmission part and the second transmission part are both in power transmission coupled with the power shaft, and the power shaft can drive the first transmission part and the second transmission part to move back and forth alternately through alternate forward and reverse rotation, and the side-mounted synchronizing device is disposed on a side of the stationary base by means of extension of the power shaft so as to stay away from the water mist, and an axial extension direction of the power shaft is perpendicular to a direction in which the first transmission part and the second transmission part move back and forth along the extension direction of the stationary base.

2. The side-mounted synchronous transmission apparatus for a double-saw machine according to claim 1, wherein the power shaft is further provided with a first transmission shaft and a second transmission shaft, the first transmission part is coupled with the first transmission shaft, and the second transmission part is coupled with the second transmission shaft; the first transmission shaft and the second transmission shaft are arranged parallel to each other on the same side of the first transmission part and the second transmission part.

3. The side-mounted synchronous transmission apparatus for a double-saw machine according to claim 2, wherein the first transmission part is provided with a first synchronous belt and a first driving wheel, the second transmission part is provided with a second synchronous belt and a second driving wheel, the first driving wheel is coupled with the first transmission shaft through a coupling, and the second driving wheel is coupled with the second transmission shaft through a coupling.

4. The side-mounted synchronous transmission apparatus for a double-saw machine according to claim 3, wherein the side-mounted synchronizing device is further provided with a first gear and a second gear meshed with each other and with the same number of teeth, the first gear is installed on the first transmission shaft, and the second gear is installed on the second transmission shaft; the first gear and the second gear rotate with the same rational speed and opposite rotational directions when they mesh with each other for power transmission.

5. The side-mounted synchronous transmission apparatus for a double-saw machine according to claim 4, wherein the apparatus is further provided with an electric motor, which is axially coupled with the first transmission shaft or the second transmission shaft and is disposed opposite to the first driving wheel and the second driving wheel.

6. The side-mounted synchronous transmission apparatus for a double-saw machine according to claim 5, wherein a first driven wheel is further disposed on an inner side of the first synchronous belt, both the first driving wheel and the first driven wheel are disposed on the stationary base, and the first synchronous belt can rotate under the support of the first driving wheel and the first driven wheel.

7. The side-mounted synchronous transmission apparatus for a double-saw machine according to claim 6, wherein a second driven wheel is further disposed on an inner side of the second synchronous belt, both the second driving wheel and the second driven wheel are disposed on the stationary base, and the second synchronous belt can rotate under the support of the second driving wheel and the second driven wheel.

8. The side-mounted synchronous transmission apparatus for a double-saw machine according to claim 7, wherein extension directions of the first synchronous belt and the second synchronous belt are both along a length direction of the stationary base, and the first synchronous belt and the second synchronous belt are parallel to each other in their extension directions.

* * * * *